Jan. 16, 1934.  J. J. PAUGH  1,943,771

WELDING ELECTRODE

Original Filed Aug. 19, 1929

INVENTOR:
James J. Paugh,
BY
John P. Tarbox
ATTORNEY.

Patented Jan. 16, 1934

1,943,771

UNITED STATES PATENT OFFICE 1,943,771

WELDING ELECTRODE

James J. Paugh, Philadelphia, Pa., assignor to Edward G. Budd Manufacturing Company, Philadelphia, Pa., a corporation of Pennsylvania Application August 19, 1929, Serial No. 386,839
Renewed June 5, 1933

3 Claims. (Cl. 219—4)

My invention relates to a welding electrode and mounting therefor, and more particularly to a welding electrode of the rotary type, such as are used in seam welding.

It is a main object of my invention to improve electrodes of this type so to increase the efficiency of the machine in which they are used, and to provide an electrode which is relatively inexpensive, to manufacture, and by the use of which a material saving of copper or other metal of high conductivity suitable for electrodes is effected.

I attain these objects by providing an electrode which has an annular work engaging portion, which in its worn down condition, is not materially reduced in circumference from its original circumference, which portion can be readily replaced by another similar portion, and securely locked in position by opposing clamping means, and one which can be efficiently cooled, and consequently have its life prolonged, by providing a space between the clamping means for the circulation of cooling fluid.

Other and further objects and advantages will become apparent from the following detailed description when read in connection with the accompanying drawing disclosing a preferred embodiment of the invention.

In rotary welding machines of the known type, the electrodes are driven at a given speed and engage the work on opposite sides thereof, the welding current passing through the work from one rotary electrode to the other, and by the proper application of pressure while the work is heated by the current, the weld is effected.

To illustrate my invention, I have shown in the accompanying drawing but one of such opposed electrodes.

Figure 1:
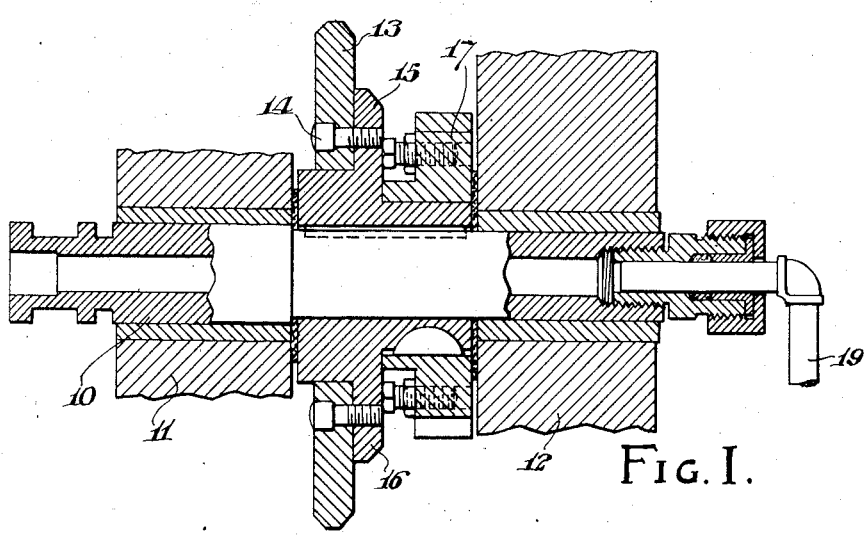
Fig. 1 is an axial section through a mounting for a known type of rotary welding electrode, shown here for comparison with the novel improved construction.

In Fig. 1, which represents prior constructions, the electrode is shown mounted on the hollow shaft 10, mounted to rotate in suitable bushed bearings 11 and 12. The electrode proper contacting the work comprises a disc 13 secured by bolts 14 to a radial flange 15 of a hub portion 16 keyed to the shaft 10 to rotate therewith. A reduced extension of the hub has keyed thereto a gear 17, through which the electrode is driven from a suitable source of power. The shaft 10 is hollow to permit the circulation therethrough of cooling fluid. Stuffing boxes 18, only one of which is shown, are associated with the ends of the shaft through which the cooling fluid, such as water, is passed by means of the stationary piping, as 19.

Figure 2:
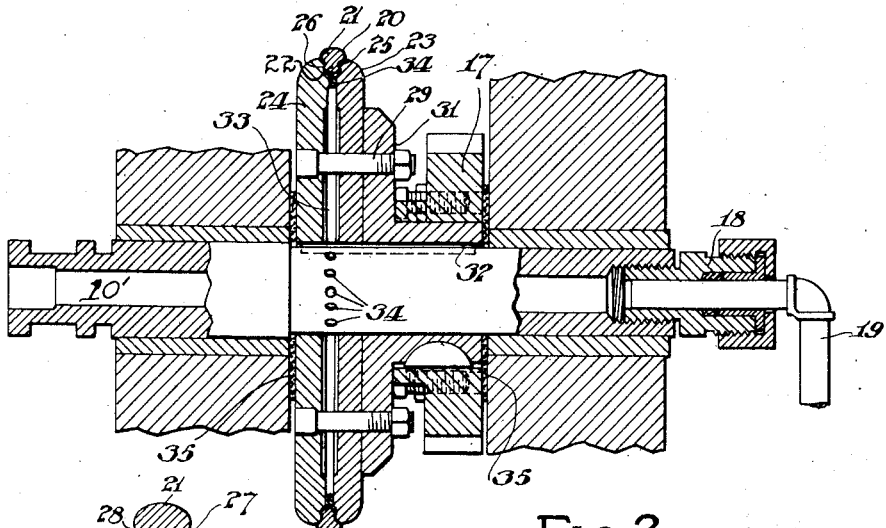
Fig. 2 is a similar section showing the novel improved electrode and mounting therefor of my invention.
Figure 3:
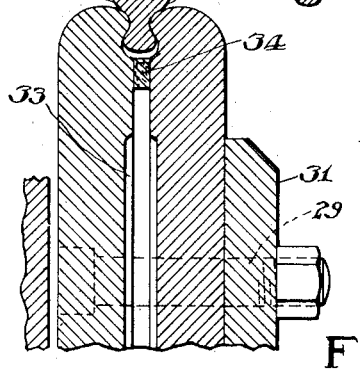
Fig. 3 is an enlarged sectional detail view.

In the novel improved construction, according to my invention, as shown in Figs. 2 and 3, the electrode proper comprises an annular member 20 which may be a continuous ring or made in separate segments with their edges in abutting relation, this member having, in the form of the invention shown, an outer enlarged tread portion 21 for engaging the work and an inner reduced portion 22 adapted to be received and secured between opposed clamping members 23, 24. These members have their outer edges formed with annular ribs 25, 26, adapted to seat in annular grooves 27, 28 formed between the inner reduced portion 22 and the tread portion 21 of the annular electrode proper, to securely clamp it in place.

The clamping members 23, 24 are keyed to the hollow shaft 10' mounted in the bearings 11, 12, similar to the bearings 11, 12 of the previous construction shown in Fig. 1, and are drawn up by bolts 29 extending through them and through the flange 31 of the hub member 32 sleeved over and keyed to the shaft 10' to which hub member the gear 17 is secured. The clamping members may be of copper or other metal of high conductivity, and the electrode proper may be made of similar material. Ordinary trolley wire has been found to answer the purpose very satisfactorily, and used trolley wire can be obtained at very low cost, and in a condition still admirably suited for the purpose of the invention. By this construction, in which the peripheral portion of the roller electrode, or electrode proper is readily renewable at will, it is possible to maintain the machine at all times up to full welding efficiency, and with a minimum of waste of the copper or other metal which happens to be in use.

Another feature of the novel form of electrode is the adaptability for adequate cooling of the same. A considerable space 33 is formed between the opposed clamping members 23, 24 by suitably hollowed out central portions, this space communicating either directly with the inner surfaces of the annular electrode member proper 20, or where an annular bushing, as 34, is provided, as shown, to seal the outer portion of the space between the clamps, the space nevertheless extends into close proximity to the member 20. By providing a water circulating system in which water is admitted into the space 33, a very effective cooling of the electrode is assured, with consequent speeding up of the machine in which it is used, and longer life of the electrode.

One means by which this admission of water to the space 33 may be accomplished is by providing holes 34 in the hollow shaft wall establishing communication between the inner conduit formed by the hollow shaft and the space 33. By placing a suitable baffle (not shown) in the hollow of the shaft the water may be caused to pass from one end of the shaft through some of the holes 34 into the space 33, and to leave the space 33 through one of the holes 34 passing from the other end of the shaft, thus providing a continuous circulation. Suitable packing members, as 35, may be used to prevent undue leakage.

The particular manner in which the cooling water is introduced or circulated in the space 33 is not material to the present invention, and the specific means employed may vary widely. It is a part of the present invention, however, that such a space 33 is provided, which permits bringing the cooling fluid close to the electrode proper, and thus permits effective cooling.

What I claim and desire to secure by Letters Patent is:

1. A rotary welding electrode comprising, in combination, a hollow shaft, a pair of disc members secured to said shaft to rotate therewith, having opposed peripheral sections comprising clamping portions, a removable conducting electrode portion of substantially figure-eight cross section having its minor section secured between said clamping portions and completing an enclosed space for a cooling medium, and means to impart rotary motion to said electrode.

2. A rotary welding electrode comprising, in combination, a hollow shaft, a pair of disc members secured to said shaft to rotate therewith, having opposed peripheral sections comprising clamping portions, a removable conducting electrode portion of a cross section having its minor section secured between said clamping portions and completing an enclosed space for a cooling medium, and means to impart rotary motion to said electrode, the major part of the cross section of said electrode portion projecting radially freely beyond the peripheries of said disc members and having a centering seat at an angle to the axis of rotation located radially within said freely extending major part.

3. A rotary welding electrode comprising, in combination, a hollow shaft, a pair of disc members secured to said shaft to rotate therewith, having opposed peripheral sections comprising clamping portions, a removable conducting electrode portion of a cross section having its minor section secured between said clamping portions and completing an enclosed space for a cooling medium, and means to impart rotary motion to said electrode, the major part of the cross section of said electrode portion projecting radially freely beyond the peripheries of said disc members and having a centering seat at an angle to the axis of rotation located radially within said freely extending major part, and said electrode portion being wire-like in form, whereby it may be constituted of wire if desired.

JAMES J. PAUGH.